United States Patent [19]

Kawakubo et al.

[11] Patent Number: 5,420,844
[45] Date of Patent: May 30, 1995

[54] INFORMATION RECORDING AND REPRODUCING APPARATUS FOR REDUCING AVERAGE DC LEVEL VARIATION

[75] Inventors: Naoto Kawakubo, Odawara; Makoto Asari, Yokohama; Takahiro Sunada, Chigasaki; Noritaka Narita, Fujisawa, all of Japan

[73] Assignees: Hitachi, Ltd., Tokyo; Hitachi Video & Information System, Inc., Kanagawa, both of Japan

[21] Appl. No.: 155,856

[22] Filed: Nov. 23, 1993

[30] Foreign Application Priority Data

Nov. 24, 1992 [JP] Japan .................. 4-313572

[51] Int. Cl.[6] .................. G11R 5/76; H04N 5/76; H03M 7/00
[52] U.S. Cl. .................. 369/59; 341/59; 375/292
[58] Field of Search .................. 369/59; 341/58, 59; 360/51, 53, 40, 41, 13; 370/105.5, 100.1; 371/61, 64; 375/113, 116, 19, 114, 115

[56] References Cited

U.S. PATENT DOCUMENTS

| | | | |
|---|---|---|---|
| 4,211,997 | 7/1980 | Rudnick et al. | 360/53 X |
| 4,617,599 | 10/1986 | Noguchi et al. | 360/51 X |
| 4,713,802 | 12/1987 | Kobata et al. | 369/59 |
| 4,774,701 | 9/1988 | Ozaki et al. | 369/59 |
| 4,777,542 | 10/1988 | Ozaki | 360/40 X |
| 4,942,565 | 7/1990 | Lagadec | 369/59 |
| 5,216,657 | 6/1993 | Nishiuchi et al. | 369/59 X |
| 5,229,986 | 7/1993 | Mizokami et al. | 369/59 |
| 5,291,470 | 3/1994 | Nishiuchi et al. | 369/59 X |

Primary Examiner—Aristotelis Psitos
Assistant Examiner—Patrick Wamsley
Attorney, Agent, or Firm—Fay, Sharpe, Beall, Fagan, Minnich & McKee

[57] ABSTRACT

An information recording method and apparatus records information signals having data signals and synchronizing signal patterns inserted at predetermined intervals of the data signals on a recording medium with a binary level by using a coding rule without a DC free property. The synchronizing signal patterns are inserted into the data at intervals of a fixed block length and are supplied to a recording apparatus as a mark/space pattern (record signal pattern). The data are converted into the same pattern as the mark/space pattern and an accumulated value (corresponding to the average DC value) for each block length is counted. The sum and the difference of an output of a memory which stores the accumulated values from the head of the sector to the (N−1)-st block, and the accumulated value of the N-th block, are compared with each other in absolute value. When the difference is smaller than the sum, a pattern inversion circuit is operated at the head of the N-th block of the record code string to invert the polarity of the record signal pattern, and when the sum is smaller than the difference, the pattern inversion circuit is not operated and the polarity of the record signal pattern is not inverted.

20 Claims, 8 Drawing Sheets

INFORMATION RECORDING AND REPRODUCING APPARATUS FOR REDUCING AVERAGE DC LEVEL VARIATION

BACKGROUND OF THE INVENTION

The present invention relates to an information recording method and apparatus for recording information on a recording medium and reproducing the recorded information, and more particularly to such an information recording method and apparatus for effectively reducing variation of an average DC level of recorded data or a reproduced signal occurring when information is recorded on or reproduced from the recording medium, such as an optical disk medium, by using a coding rule without a DC free property.

Generally, in an information recording system in an optical disk file, it is effective to improve the signal-to-noise ratio of the reproduced data in order to reduce the error rate of the reproduced data.

Heretofore, as a method of binarizing the reproduced signal, the following two methods are known. The first method involves binarizing by a fixed slice level a detection signal that is varied in accordance with the presence of a record mark recorded on an optical disk, and is hereinafter referred to as an original waveform detection method. The second method involves detecting a position for a code word by differentiating the detection signal, and is hereinafter referred to as a differential detection method. In a system for causing the code word to correspond to the center of the record mark, hereinafter referred to as a mark position recording system, the detection signal is conventionally first-order differentiated, and a zero-cross point of the differentiated signal is detected. In a system for causing the code word to correspond to both ends of the record mark, hereinafter referred to as a mark edge recording system, the detected signal is conventionally second-order differentiated and a zero-cross point of the differentiated signal is detected.

The degree of reduction of the signal-to-noise ratio occurring in binarizing the reproduced signal is smaller in the original waveform detection method than in the differential detection method.

On the other hand, the DC free property may be useful for characterizing the modulation system (coding rule). The average DC level (DC component) of the reproduced signal obtained from the record pattern is always constant within the range of a certain data length (for example, one byte period). One method of estimating the degree of the DC free property uses an accumulated charge value. The accumulated charge value is an accumulated value in a certain data period when the polarity corresponding to the record mark or the side of the mark of a reproduced waveform obtained from the record mark is + (plus) and the polarity corresponding to an unrecorded portion between the marks, that is, a gap, is − (minus). When the DC free property is perfectly satisfied, the accumulated charge value is always 0. Generally, when the accumulated charge value in a proper section of the data length, for example, one byte, is 0, it is judged that the record pattern is DC free. The accumulated charge value is also known as the DSV (Digital Sum Variation).

No variation of the average DC level of the reproduced signal occurs by using the coding rule having the DC free property even when the reproduced signal system is connected by means of a coupling capacitance. In the differential detection method, since signals of the lower side and the upper side which are equal to each other in number and have the same amplitude are produced from the nature of the differential waveform, the average DC level of the reproduced signal is maintained substantially constant even when there is no DC free property in the modulation system itself.

In the standard of the ISO (International Standardization Organization), the mark position recording system of the 2-7 RLL (Run Length Limited) is used as the modulation system and a re-synchronous pattern of one byte is inserted at intervals of 20 bytes of data. The re-synchronous pattern (RESYNC) has a function of correcting a shift when a phase relation of a bit extraction clock produced by a PLL and the reproduced data is shifted by one bit or more.

In the ISO standard, the re-synchronous pattern is a specific pattern and is not changed by data positioned before and behind it. Further, since the mark position recording system is used as the recording system, detection of the mark position is made by the usual differential detection method, and accordingly the need of the DC free property is not so strong.

SUMMARY OF THE INVENTION

The mark edge recording system which causes the code word to correspond to both ends of the record mark is effective for the promotion of high-density recording of the optical disk. According to the mark edge recording system, it can be expected that the line recording density is improved to about twice that of the mark position recording system with respect to the same size mark.

In the mark edge recording system, the differential detection method is generally used in order to detect the edge position, and the DSV can approach 0 with respect to the DC free property regardless of the modulation system. However, the original waveform detection method is advantageous as compared with the differential detection method in consideration of reduction of the signal-to-noise ratio in the reproduction system.

In the original waveform detection method, if a circuit configuration having a pass band covering the DC level is not provided, the average DC level of the reproduced signal varies in the modulation system having no DC free property, and it is thus difficult to detect the edge position exactly, Accordingly, when a modulation system having no DC free property is used and the original waveform detection method is employed, suppression of the variation of the average DC level by the record data pattern upon recording is a problem.

U.S. patent application Ser. No. 08/016,897, filed Feb. 12, 1993, the disclosure of which is hereby incorporated by reference, discloses a system for suppressing level variation of the reproduced signal while the self-clocking property is maintained, by providing a mark-length changing code in the re-synchronous pattern so that the sum of the lengths of mark portions (pit portions) of the whole record block is equal to the sum of the lengths of space portions (portions other than the pit portions) when information is recorded on a recording medium such as an optical disk, by means of a modulation system having no DC free property and the mark edge recording system.

This system can suppress the variation of the average DC level of the record data having no DC free property and make the level thereof constant, while, since the sum of the mark lengths is compared with the sum of the space lengths at a certain time to determine whether the changing code has been inserted into the re-synchronous pattern at that time, the changing code is inserted irrespective of the mark/space ratio in the record data after that time, and it has been found that the average DC level cannot be made sufficiently constant depending on the mark/space ratio.

Accordingly, it is an object of the present invention to solve the problems in the prior art by providing an information recording system and apparatus capable of using the original waveform detection method, which is advantageous in term of the signal-to-noise ratio, by using a modulation system having no DC free property and sufficiently suppressing variation of the average DC level of the record data pattern upon recording.

It is another object of the present invention to provide an information recording system and apparatus capable of always predicting and measuring the sum of the mark lengths and the sum of the space lengths as well as a data block in which recording is to be made when the modulation system having no DC free property and the original waveform detection method are used, so that variation of the average DC level of the record data pattern including the data block is reduced as much as possible.

In order to achieve the above objects, according to an aspect of the present invention, an information recording apparatus for recording binary information signals having data signals and synchronizing signal patterns inserted at predetermined intervals of the data signals, on a recording medium, by using a coding rule without a DC free property, comprises a synchronizing signal pattern inversion circuit capable of inverting the pattern of the information signals to be recorded so that a first level and a second level are replaced with each other at positions of the synchronizing signal pattern, a recording device to which an output of the synchronizing signal pattern inversion circuit is supplied, prediction means for previously predicting an accumulation value of the respective levels (corresponding to average value level) of the information signals before and after a position of a certain synchronizing signal pattern, and control means for controlling inversion of the polarity of the information signal pattern after the position of the certain synchronous signal pattern, so that the average DC level of the information signals supplied to the recording device is made constant (zero level) on the basis of the measured result.

In a preferred embodiment, the prediction means includes an accumulation value memory device for previously storing the accumulated value of the level of the information signals from the head of the information signal to the position of the certain synchronizing pattern, measurement means for previously measuring the accumulated value of the level of the information signals for a predetermined period after the position of the synchronizing signal pattern, and an adder and a subtracter for outputting an addition value and a subtraction value of an output of the accumulation value memory device and an output of the measurement means.

The accumulation value memory device is configured to successively update the accumulated value by either the addition value or the subtraction value, whichever has the smallest magnitude.

Preferably, the control means includes means for comparing the absolute values of the addition value and the subtraction value with each other, and means for operating the synchronizing signal pattern inversion circuit so as to invert the polarity of the information signal pattern after the certain synchronizing signal pattern when the absolute value of the subtraction value is smaller than the absolute value of the addition value, and otherwise not to invert the polarity of the information signal pattern after the certain synchronizing signal pattern.

In another embodiment, the control means may include means for comparing the polarities of the output of the accumulation value memory device and the output of the measurement means, and means for operating the synchronizing signal pattern inversion circuit so as not to invert the polarity of the information signal pattern after the certain synchronizing signal pattern when the polarities are different from each other, and otherwise to invert the polarity of the information signal pattern after the certain synchronizing signal pattern.

Further, the synchronizing signal pattern inversion circuit can be configured to prepare two kinds of synchronizing signal patterns having different numbers of inversion bits, and to select any one of the synchronizing signal patterns in accordance with whether the polarity of the information signal pattern is inverted or not.

The operation based on the above configuration is now described.

The information signal in the present invention is a signal having no DC free property and includes the data signals and the synchronizing signal pattern inserted at predetermined intervals of the data signals, for example, every block. The prediction means includes, for example, the accumulation value memory device and the measurement means (up/down counter). The accumulation value memory device previously stores the level accumulation value (corresponding to the average DC level) of the information signals (first to N−1st information signals) from the head (first sector) of the information signal to the position of the synchronizing signal pattern positioned in a certain order (for example, N-th). The measurement means previously measures the level accumulation value (average DC level) of the information signals after the position of the synchronizing signal pattern in the certain order (for example, the N-th information signal until the N+1st synchronizing signal pattern position).

The adder and the subtracter produce a sum (addition value) and a difference (subtraction value) of the accumulation value stored in the accumulation value memory device and the accumulation value stored in the measurement means, respectively. The sum (addition value) expresses a prediction value of an overall accumulation value of the information signals from the head position to the position of the N+1st synchronizing signal pattern (overall average DC level) when the polarity of the pattern is not inverted, and the difference (subtraction value) expresses an overall accumulation value from the head position to the position of the N+1st synchronizing signal pattern when the polarity of the pattern of the information signals after the position of the N-th synchronizing signal pattern is inverted.

Thus, the control means, for example, an absolute value comparison circuit, compares absolute values of the sum and the difference and controls the synchronizing signal pattern inversion circuit in accordance with the condition for the smaller absolute value. More particularly, when the sum is smaller than the difference, the polarity of the pattern is not inverted even after the position of the N-th synchronizing signal pattern of the information signal (input of the synchronizing signal pattern inversion circuit) and the polarity is maintained as it is, while when the difference is smaller than the sum, the polarity of the information signal pattern is inverted after the position of the N-th synchronizing signal pattern until the next synchronizing signal pattern. Consequently, the total average DC level from the head position to the position of the N+1st synchronizing signal pattern of the information signal supplied to the memory device is fixed to a substantially zero level (average level upon the duty ratio of 50%).

Whichever one of the sum and the difference is smaller in absolute value is selected and stored in the accumulation value memory device (i.e., the accumulation value memory device is updated). The updated accumulation value is used in the same manner as the above as the basis for performing addition and subtraction for the next accumulation value. The same process is repeatedly made for each block of the information signal.

A sign comparison circuit can be used as the control means in place of the absolute value comparison circuit. In this case, the sign comparison circuit compares the polarities of the outputs of the accumulation value memory device and the measurement means, and when both the polarities are identical, the polarity of the pattern of the information signal is inverted and is produced from the synchronizing signal pattern switching circuit (in the same manner as in the case where the difference is smaller). On the other hand, when the polarities are different from each other, the polarity of the pattern of the information signal is not inverted and is produced from the synchronizing signal pattern switching circuit (in the same manner as in the case where the sum is smaller). Other points are the same as in the case where the absolute value comparison circuit is used.

As described above, according to the present invention, when the coding rule having no DC free property is used to record the information signal on a recording medium such as an optical disk, an optical magnetic disk or a magnetic disk, an accumulation value is measured at predetermined intervals. The accumulation value (first accumulation value) from the head position to a certain position (first position) of the information signal is defined as the base, and the polarity of the pattern in the subsequent term (first position to a second position) of the information signal is determined so that an accumulation value of the whole information signal equal to the sum of the base and an accumulation value (second accumulation value) in the subsequent term (first position to the second position) of the information is zero. Accordingly, variation of the average DC level of the recording signal to be recorded can be made as constant as possible (reduced to zero level).

Particularly, in the present invention, since not only the accumulation value from the head position to the first position, but also the accumulation value from the first position to the second position is predicted for the case where the polarity is inverted, and for the case where it is not inverted and the polarity of the information signal pattern at the first position or the second position is determined so as to reduce the overall accumulation values on the basis of the predicted value, variation of the DC level can be removed correctly to meet the actual information signal pattern.

DESCRIPTION OF THE PREFERRED EMBODIMENTS

Figure 1:
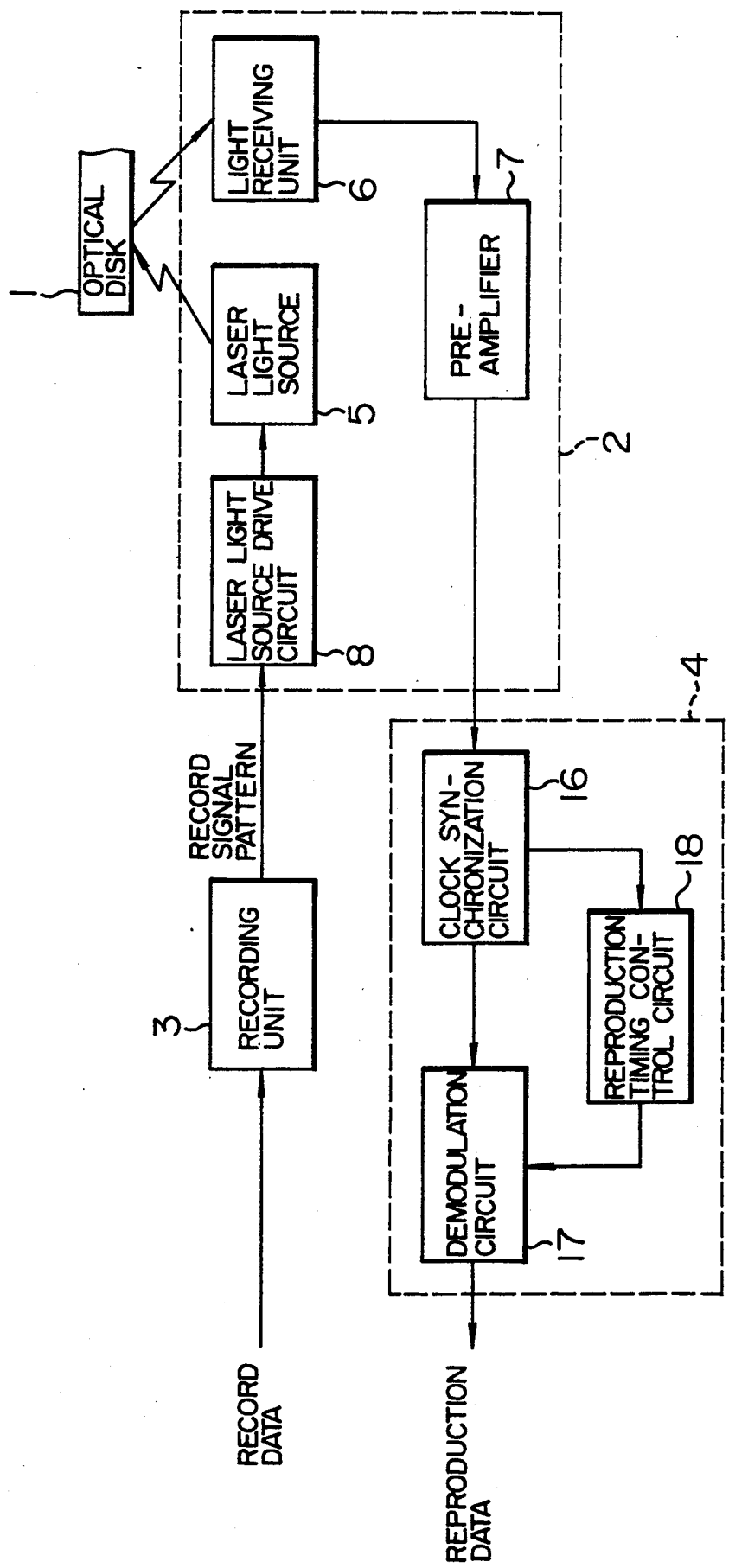
FIG. 1 is a block diagram schematically illustrating an embodiment of an optical disk information recording and reproducing apparatus to which an information recording method of the present invention is applied.

Referring now to the accompanying drawings, preferred embodiments of the present invention are described. Like elements are designated by like reference numerals throughout the drawings and repeated description is omitted.

FIG. 1 is a block diagram schematically illustrating an embodiment of an optical disk apparatus to which an information recording system of the present invention is applied.

The optical disk information recording and reproducing apparatus of FIG. 1 includes a recording unit 3 for converting information to be recorded on an optical disk 1 rotated at a fixed angular velocity into record waveform data, a head portion 2 for writing and reading the data onto and from the optical disk 1, and a reproduction unit 4 for reproducing information from the signal read by the head portion 2 and for demodulating the reproduced information.

The principal part of the present invention is the recording unit 3 for converting the information to be recorded into the record waveform data.

The head portion 2 includes a laser light source 5 for irradiating an optical beam onto the optical disk 1, a light receiving unit 6 for detecting reflected light of the optical beam by the optical disk 1, a pre-amplifier for amplifying a detection signal detected by the light receiving unit 6 to a predetermined signal level, and a laser light source drive circuit 8 for driving the laser light source 5.

The reproduction unit 4 reproduces the detection signal detected by the head portion 2 and demodulates the reproduced signal, and includes a clock synchronization circuit 16 for forming a reproduction clock bit synchronized with the detection signal and for producing data in synchronism with the reproduction clock; a demodulation circuit 17 for demodulating the data produced by the clock synchronization circuit 16; and a timing control circuit 18 for controlling the timing of the reproduction unit 4.

The recording unit 3 will be described in detail below.

Figure 2:
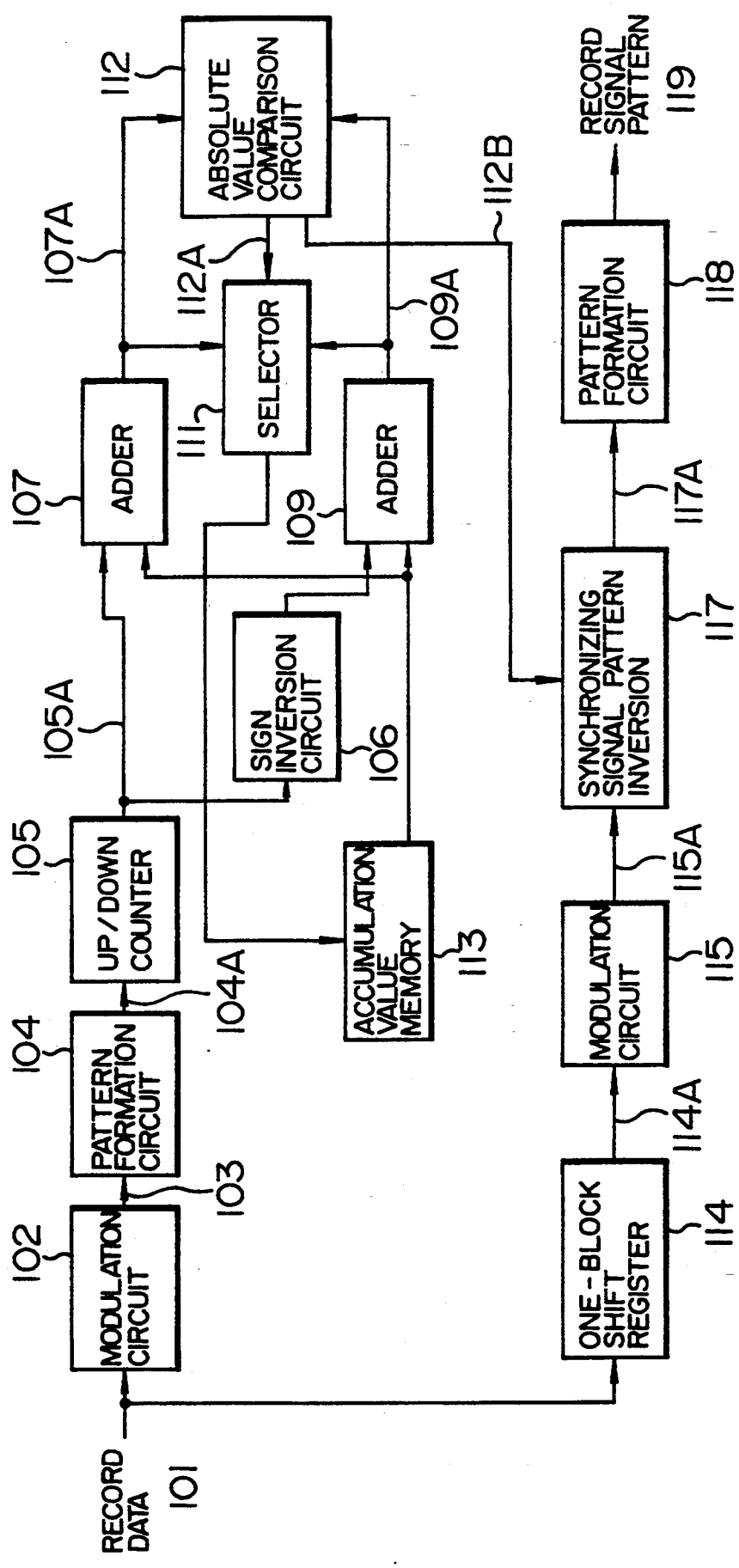
FIG. 2 is a block diagram schematically illustrating a recording apparatus of an embodiment of the present invention.

FIG. 2 is a block diagram schematically illustrating an embodiment of an information recording apparatus (corresponding to the recording unit 3 of FIG. 1) according to the present invention.

In FIG. 2, the record data is supplied to a modulation circuit 2 for converting the record data into code word data (code pattern) made of a run-length limited code in accordance with a predetermined coding rule (in the embodiment, the 1-7 modulation system), and is converted into a record code string 103 suitable for the record characterization of the optical disk. The record code string 103 is supplied to a pattern formation circuit 104 constituted by a T flip-flop (toggle flip-flop), the output of which is inverted when a logic signal "1" is applied to the flip-flop, and converted into a record signal pattern 104A.

The record signal pattern 104A is supplied to an up-/down counter 105. The up/down counter 105 is incremented when an input is a logic "1" and is decremented when the input is a logic "0". The up/down counter 105 then outputs a measured value 105A in accordance with the logic levels of the record pattern string 104A.

An output of an accumulation value memory 113 having the initial state of zero (for example, a value of a head position of a sector) and the measured value 105 are supplied to an adder 107, which produces an addition value 107A. The measured value 105A is supplied to a sign inversion circuit 106 which inverts the polarity of the most significant bit (MSB) of the measured value to invert the sign (+ or −) thereof, to thereby multiply the measured value by −1. The thus-multiplied measured value and the output of the accumulation value memory 113 are supplied to an adder 109 to thereby obtain an addition value 109A. The addition values 107A and 109A are supplied to an absolute value comparison circuit 112 so that absolute values thereof are compared with each other.

As a consequence of the comparison, a level signal 112A indicative of the addition value 107A or 109A having the smaller absolute value is produced, and the addition value 107A or 109B having the smaller absolute value is stored in the accumulation value memory 113 by means of a selector 111 in accordance with the level signal 112A.

On the other hand, the record data 101 is supplied to a one-block shift register 114 having a memory capacity in which data for a predetermined interval from a synchronizing signal to a next synchronizing signal (hereinafter referred to as one block data) is stored, and which produces first inputted data when the stored data reaches the capacity of the memory, and then data is further inputted. An output 114A of the one-block shift register is converted into a record code string 115A through a modulation circuit 115.

The absolute value comparison circuit 112 also produces an inversion signal 112B, which inverts the polarity of a portion of the synchronizing signal pattern at the timing that the synchronizing signal pattern of the record code string 115A passes through a synchronizing signal pattern inversion circuit 117.

An inverted output signal 117A produced by the synchronizing signal pattern inversion circuit 117 is supplied to a pattern formation circuit 118 having the same configuration as that of the pattern formation circuit 104 and is converted into a record signal pattern 119 for recording on the recording medium.

Figure 3:
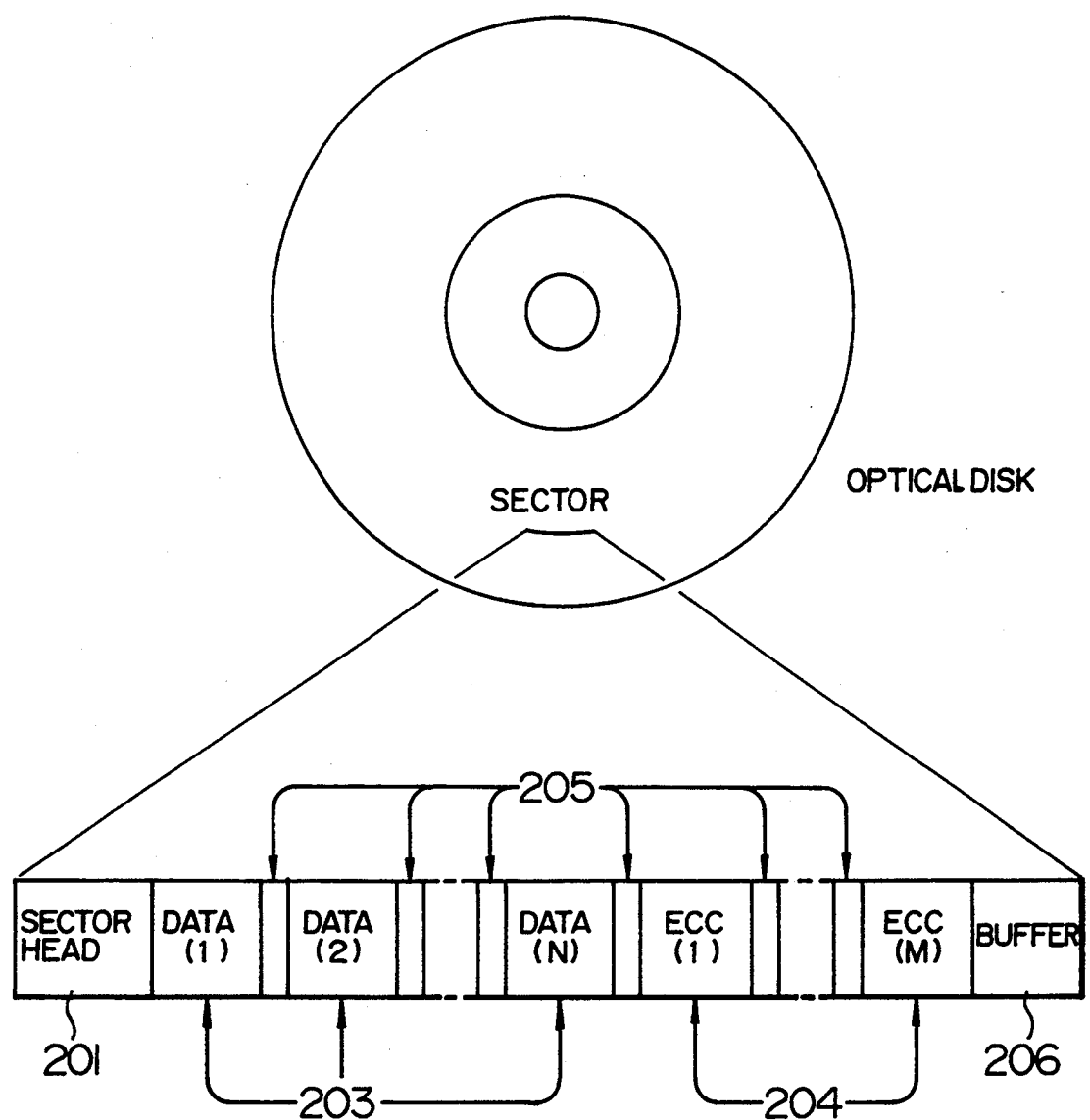
FIG. 3 shows an information sector and a record format thereof of an optical disk to which a recording method of the present invention is applied.

Referring now to FIG. 3, the format of data recorded on the recording medium is described.

Recording and reproduction of information to and from the optical disk recording medium is made in sector units. There are a hundred thousand or more sectors on an information track provided helically from the inner periphery to the outer periphery of the optical disk. Each of the sectors has a portion called a sector address. Upon reproduction, the sector address can be decoded to recognize or identify each of the sectors.

FIG. 3 shows a record format of one sector in which information of the optical disk is recorded.

A sector head portion 201 is provided in the head of the sector. The sector head portion 201 has information including a sector mark for recognizing the head of the sector and the sector address, the information being previously formed upon manufacturing of the optical disk.

Areas continuing to the sector head portion 201 are portions in which information to be recorded is recorded as a record mark and signals 203 which are the user information code-converted by the modulation circuit are recorded. The information quantity recorded in one sector is determined and is usually one K byte or 512 bytes. After a predetermined quantity of user information, error correction codes (ECC) 204 are recorded to detect and correct an error occurring when the user information is reproduced in error due to noise or the like upon reproduction. The user information signals 203 and the ECC's 204 are divided into a predetermined amount of block data constituted by data (1), data (2), . . . , data (N), and ECC (1), ECC (2), . . . , ECC (M) to be stored in the sector, and the synchronizing signals 205 are recorded between block data.

The synchronizing signal 205 is provided to prevent the timing from being shifted in the reproduction operation and the signal from being reproduced in error thereafter when a bit clock for reading out the reproduction data upon the reproduction cannot be extracted in a portion (defective portion) in which the record mark cannot be recorded continuously due to defects or flaws on the optical disk, or when a bit clock is produced needlessly or excessively due to noise. More particularly, by inserting a detectable specific pattern as the synchronizing signal at predetermined intervals, the shift of the timing is detected on the basis of the synchronizing signal upon reproduction to recover the synchronization, so that the reproduction operation is restored to the normal state again. An error in the reproduction from the defective portion to the synchronizing signal can be corrected using the error correction code.

After the user information signals 203 and the ECCs 204 described above, there is provided a buffer portion 206 for absorbing scattered pass times for one sector occurring due to the eccentricity of the optical disk and variation of the rotational speed of a disk motor.

The record code string 103 is converted into the record signal pattern by the pattern formation circuit 104, and a method of measuring an accumulated charge value may be employed to detect variation of a low frequency component in the record signal pattern string 104A.

Figure 4:
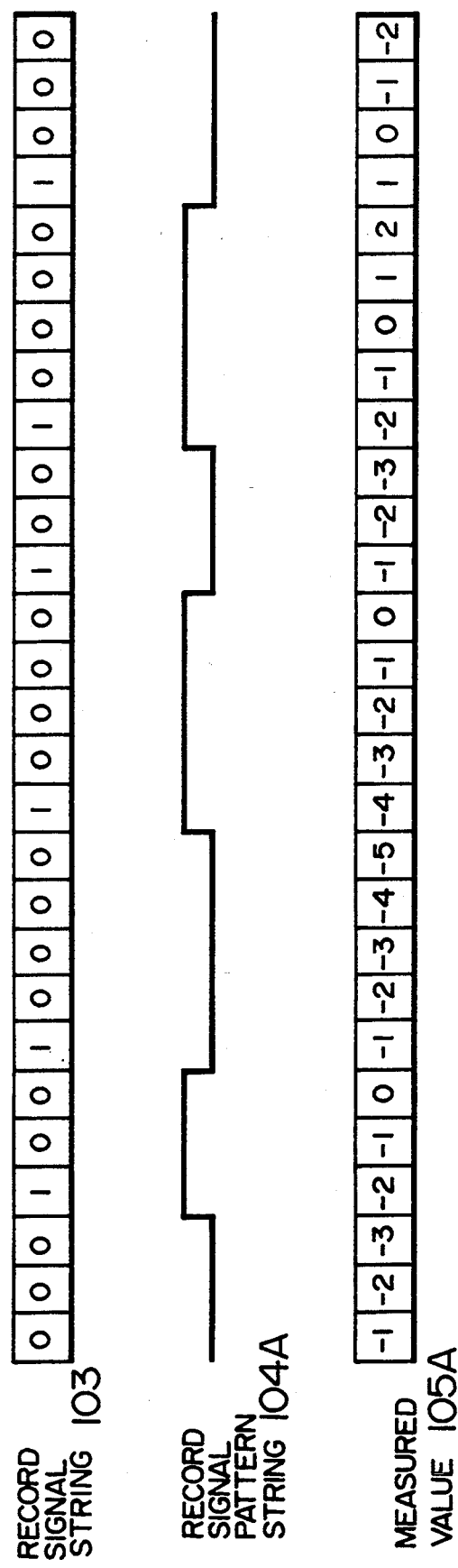
FIG. 4 shows a relation of a record signal pattern and an accumulated charge value.

In the preferred embodiment, the method is realized by using the up/down counter 105 which performs the count-up operation during the period of a logic "1" and the count-down operation during the period of a logic "0" of the record signal pattern string 104A. That is, the output signal of the up/down counter 105 indicates a measured value of a difference between accumulated periods of the logic "1" and accumulated periods of the logic "0" included in the record signal pattern string 104A. A relation of the record signal string 103, the record signal pattern string 104A and the measured value 105A is shown in FIG. 4.

It is understood that the duty ratio of the inputted record signal pattern string 104A is shifted from 50% when the absolute value of the measured value 105A is increased, for example.

Figure 5:
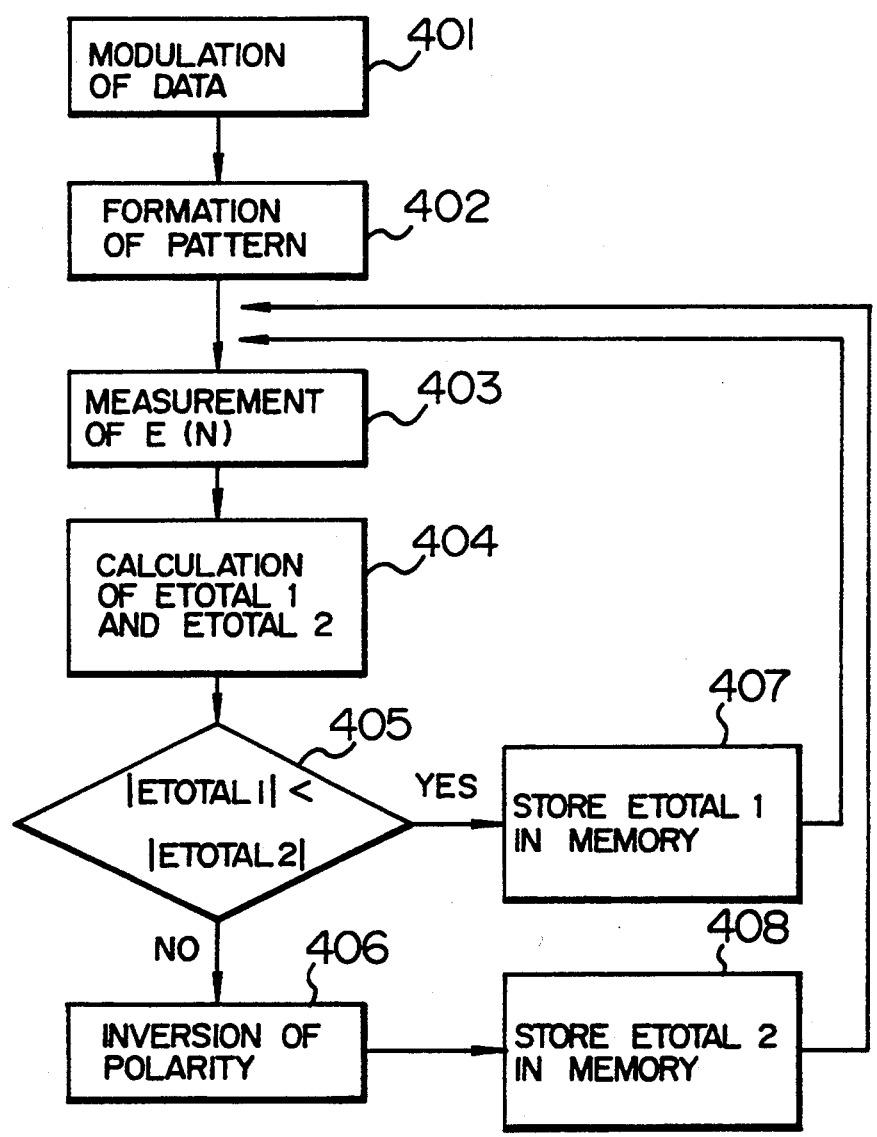
FIG. 5 is a flow chart showing the operation of a preferred embodiment of the present invention.
Figure 6:
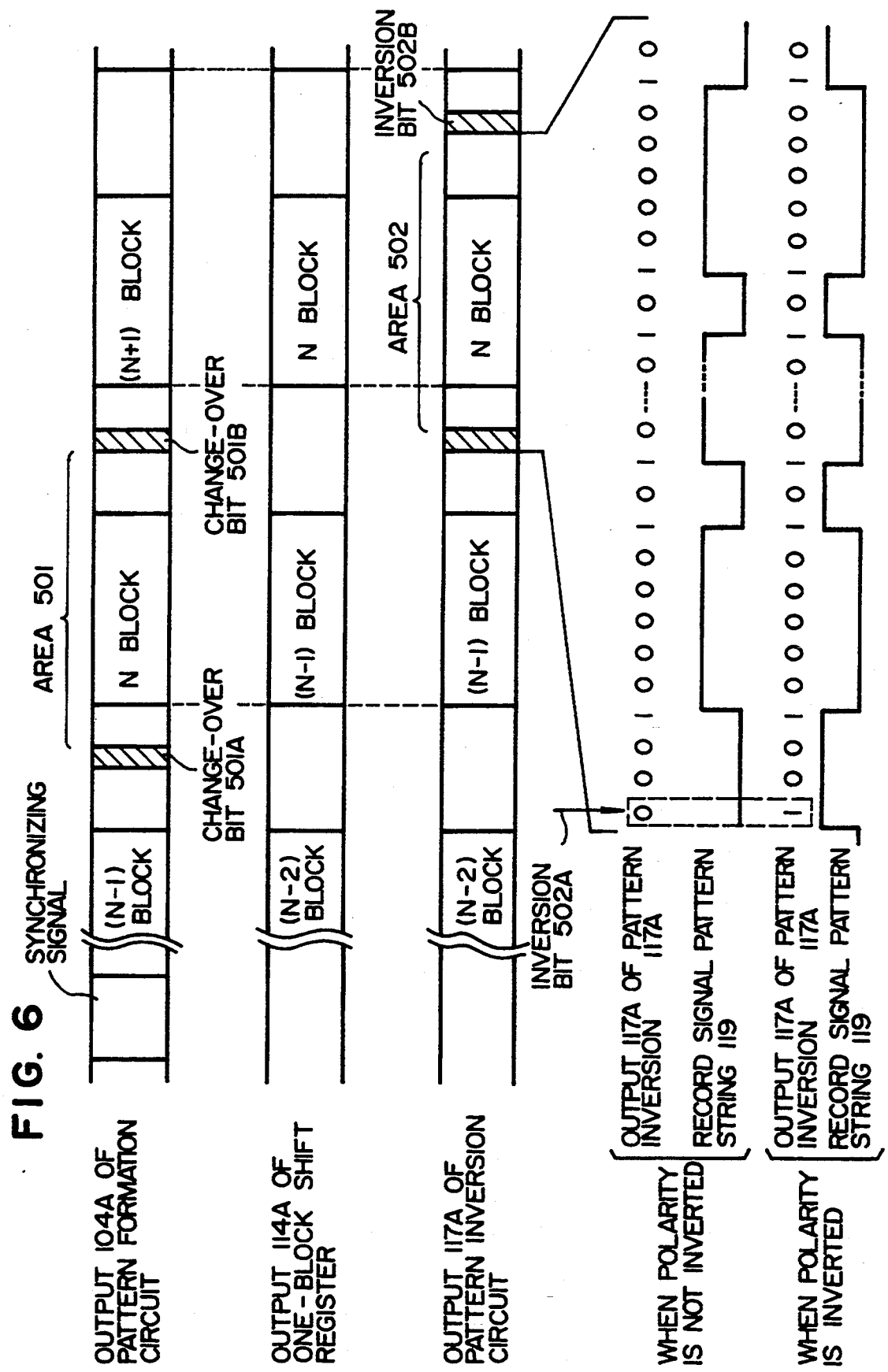
FIG. 6 is a timing chart showing the operation of a preferred embodiment of the present invention.

Referring now to FIGS. 2, 5 and 6, a method of suppressing variation of the average DC level of the record signal pattern is described. FIG. 5 is a flow chart showing a procedure of the suppression operation. FIG. 6 is a timing chart for explaining the timing of the suppression operation.

The record data 101 is coded by the modulation circuit 102 in step 401 shown in FIG. 5. Then, in step 4-2, the pattern formation circuit 104 produces an output 104A shown in FIG. 6. In FIG. 6, the pattern formation output 104A includes a data string composed of the synchronizing signal and the block data arranged alternately as described above. An area 501 represents an area from an inversion bit 501A in the synchronizing signal positioned immediately before an N-th block of an N-th block data to a bit positioned immediately before an inversion bit 501B in the synchronizing signal positioned immediately after the N-th block.

In step 403, the up/down counter 105 measures an accumulated charge value E(N) for the area 501. In this embodiment, it is assumed that the up/down counter 105 is reset to zero immediately before the beginning of each of the blocks. At this time, it is assumed that the sum total ETOTAL of the accumulated charged values for the pattern formation circuit 104A from the head of the data (for example, the head of the sector) to immediately before the area 501 is already stored in the accumulation value memory 113 through the selector 111.

In step 404, the adders 107 and 109 and the sign. inversion circuit 106 are used to calculate the ETOTAL1 and ETOTAL2 by the following equations. The ETOTAL1 is the output 107A of the adder 107 and the ETOTAL2 is the output 109A of the adder 109.

$$ETOTAL1 = ETOTAL + E(N)$$

$$ETOTAL2 = ETOTAL - E(N)$$

Then, in judgment step 405, absolute values of the ETOTAL1 and ETOTAL2 obtained in step 404 are compared with each other.

The record data 101 is supplied to the one-block shift register 114 and its output signal is delayed by the time corresponding to the area 501 with respect to the output signal 104A of the pattern formation circuit as shown by the output 114A of the one-block shift register in FIG. 6. The shift register 114 is provided for adjustment of the timing. That is, when it is assumed that the pattern formation circuit 104 is producing the head bit of the data of the N-th block, the one-block shift register 114 is producing the head bit of the (N−1)-th block at the same timing.

The output signal 114A of the one-block shift register is supplied to the synchronizing signal change-over circuit 117 through the modulation circuit 115.

As a consequence of comparison of the absolute values of ETOTAL1 and ETOTAL2 in judgment step 405 (absolute value comparison circuit 112), when the absolute value of ETOTAL1 is smaller than that of ETOTAL2, the absolute value comparison circuit 112 does not produce the inversion signal 112B to the synchronizing signal pattern inversion circuit 117, and the synchronizing signal pattern inversion circuit 117 does not invert the polarity at the timing of the change-over bit 502A, so that the record pattern string in the area 501 of the output 104A and in the area 502 of the output 117A are all identical.

In FIG. 5, the process proceeds to step 407 in which the level signal (selection signal) 112A of the absolute value comparison circuit 112 switches the selector 111 to the side of the adder output 107A to store the value of ETOTAL in the accumulation value memory 113 and the process is returned to step 103.

On the other hand, as a consequence of comparison of the absolute values of ETOTAL1 and ETOTAL2 in judgment step 405, when the absolute value of ETOTAL2 is smaller than that of ETOTAL1, the inversion signal 112B to the synchronizing signal pattern inversion circuit 117 is produced and the inversion of the polarity is made by the synchronizing signal pattern switching circuit 117 at the timing of the inversion bit 502A. Consequently, as shown in the lowermost line of FIG. 6, all of the signal patterns are inverted after the timing of the inversion bit 502A and the polarity of all the bits of the record pattern string of the area 502 of the output 117A is inverted with respect to the area 501 of the output 104A.

In FIG. 5, after the inversion of the synchronizing signal pattern in step 406, the process proceeds to step 408 in which the level signal (selection signal) 112A switches the selector 111 to the side of the adder output 109A to store the value of ETOTAL2 in the accumulation value memory 113, and the process proceeds to step 403.

Then, the pattern formation circuit output 104A is used to measure the accumulated charge value E(N−1) in the area including the (N+1)-th block having the same length as the 501, starting from the position of the inversion bit 501B. The same process as that performed after the measurement of the accumulated charge value E(N) is then performed thereby determine the polarity of the inversion bit 502B in the pattern inversion output 117A.

Similarly, the accumulated charge values E(N+2), E(N+3) E(N+4), . . . are measured and the record signal pattern recorded in the optical disk is produced while changing over the polarity of the inversion bit in the head of each area of the pattern inversion output 117A.

The value stored in the accumulation value memory 113 represents the sum total of the accumulated charge values, and, since the absolute value of the sum total of the accumulated charge values is reduced by controlling so that the absolute value of the accumulation value memory 113 is reduced at predetermined intervals (in the above example, at intervals of one block), variation of the DC component of the record signal pattern string can be suppressed.

According to this embodiment, the adder output 107A corresponds to the prediction value of the accumulated value to the N-th block when the polarity of the N-th block (area 502) is not inverted, and the adder output 109A corresponds to the prediction value of the accumulated value to the N-th block when the polarity of the N-th block (area 502) is inverted. The absolute value comparison circuit 112 compares both the prediction values and determines whether the polarity of the N-th block of the signal (output of the modulation circuit 115) 115A to be actually recorded is inverted or not in the way of the case where the absolute value is reduced to control the synchronizing signal pattern inversion circuit 117. Accordingly, since the average DC level in the cases of inversion and non-inversion of the polarity of the data block (N-th block) to be recorded is previously predicted and the polarity of the signal (N-th block) to be recorded is determined so that the average DC level is fixed (to zero) in accordance with the predicted result, the total ratio of the record mark length and space length of the signal to be actually recorded is sufficiently considered and the result can be reflected to control the average DC level to be constant exactly. The up/down counter 105, the code inversion circuit 106, the adders 107 and 109, the selector 111, the absolute value comparison circuit 112 and the accumulation value memory 113 are operated as described above and accordingly constitute a prediction/control circuit.

Figure 7:
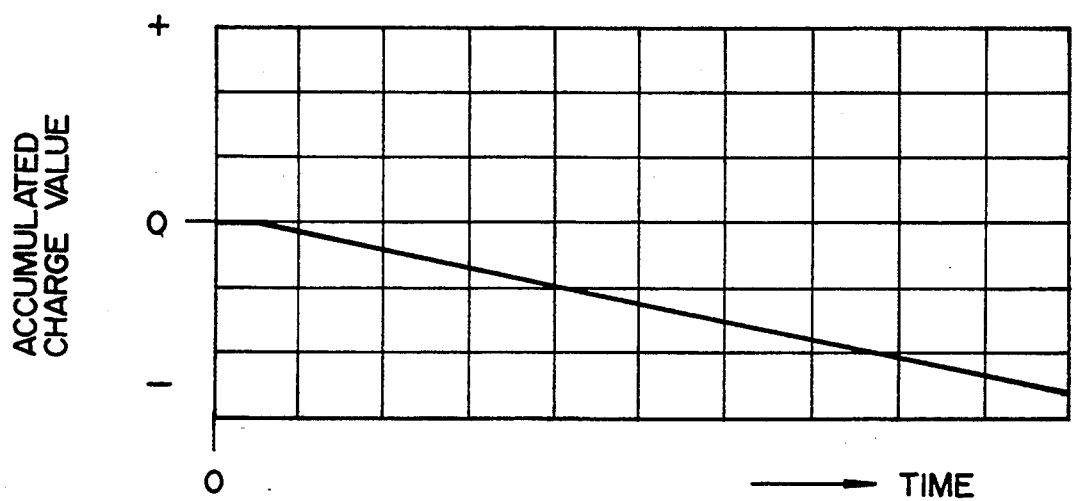
FIG. 7 shows a verified result of a recording operation by a simulation in the case where the recording method of the present invention is not applied for comparison.
Figure 8:
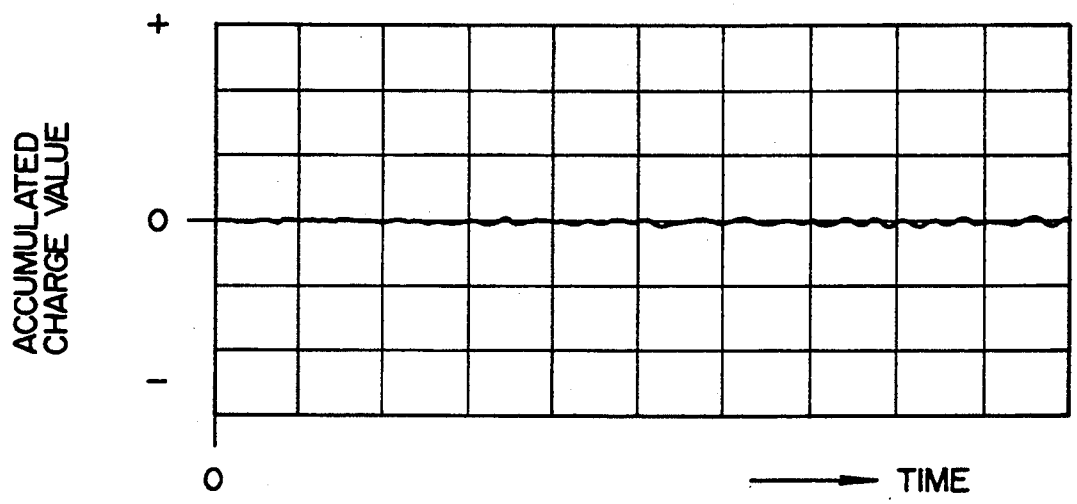
FIG. 8 shows a verified result by a simulation of the operation of a preferred embodiment of the present invention.

The simulation result of the operation performed in accordance with the flow chart shown in FIG. 5 is shown in FIGS. 7 and 8.

FIG. 7 shows the variation of the accumulated charge value reduced monotonously when the inversion operation for bits in the synchronizing signal for suppression of variation of the average DC level is not performed in all of the synchronizing signal portions for the record signal pattern string.

FIG. 8 shows the variation of the accumulated charge value when the suppression of variation of the average DC level is performed by the bit inversion operation in the synchronizing signal portion in accordance with the flow chart shown in FIG. 5 for the same record signal pattern string as the above.

When the simulation results of FIGS. 7 and 8 are compared, the accumulated charge value is reduced unilaterally in FIG. 7, whereas in FIG. 8 the absolute value of the accumulated charge value is controlled to be reduced while using the inversion bit in the synchronizing signal as a change point. Its variation is suppressed within a small range in the vicinity of a line in which the accumulated charge value is zero.

Figure 9:
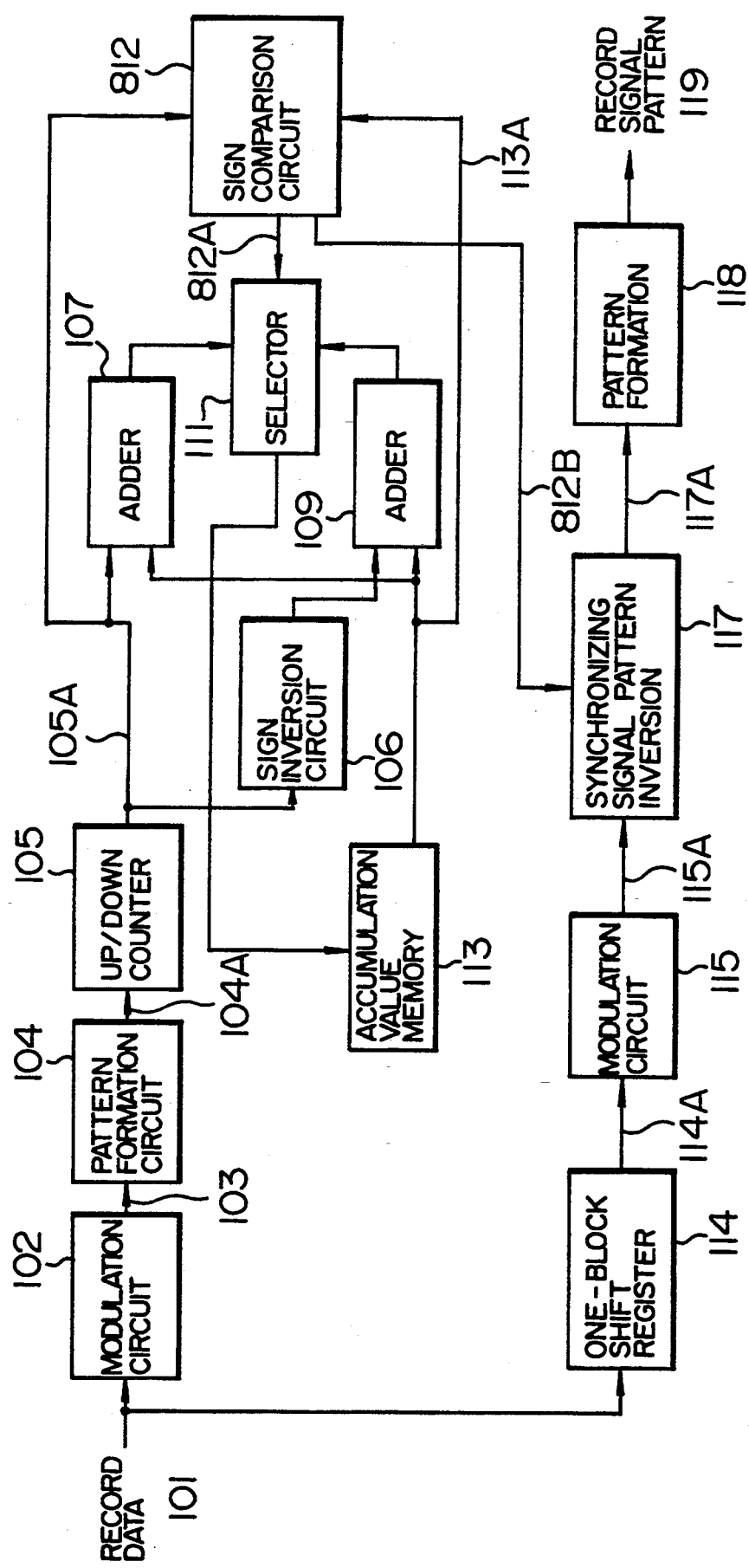
FIG. 9 is a block diagram schematically illustrating a recording apparatus according to another embodiment of the present invention.

FIG. 9 is a block diagram schematically illustrating an information recording system according to another embodiment of the present invention. In FIG. 9, the same reference numerals as those of FIG. 2 represent the same constituent elements.

A code comparison circuit 812 compares the sign of the measured value 105A produced by the up/down counter 105 with the sign of the memory value 113A produced by the accumulation value memory 113, the sign being the positive or negative polarity. In the operation for judging the polarity of the inversion bit in the synchronizing signal by means of the synchronizing signal inversion circuit 117, the sign comparison circuit 812 compares the sign bit P1 at the most significant bit of the measured value 105 (for example, "0" for a positive number and "0" for a negative number) with the sign bit P2 at the most significant bit of the memory value 113A (for example, "0" for a positive number and "1" for a negative number). When the sign bits P1 and P2 have the same polarity (in this case, the absolute value of the accumulated value tends to be increased when the polarity is not inverted), the synchronizing signal pattern inversion circuit 117 is operated by the inversion signal 812B produced by the sign comparison circuitry 812 to invert the polarity by the inversion bit in the synchronizing signal, and the selector 111 selects the addition value 109A (difference between the accumulated value until the last time and the output 105A of the up/down counter) produced by the adder 109 by the level signal 812A to store it in the accumulation value memory 113. On the other hand, when the polarities of the sign bits P1 and P2 are different from each other (in this case, the absolute value of the accumulation value tends to be reduced with the intact polarity), the inversion bit in the synchronizing signal is not inverted and the addition value 107A (sum of the accumulated value until the last time and the output of 105A of the up/down counter) produced by the adder 107 is stored in the accumulation value memory 113 to thereby suppress the level variation of the DC component of the record signal pattern to be recorded in the optical disk.

Even in this embodiment, the output 105A of the up/down counter 105 is a prediction value of the average DC level by data of the N-th block. This prediction value is sign-compared with the accumulated value 113A to the (N−1)-th block of the last time to thereby determine the polarity of data of the N-th block to be actually recorded on the basis of the comparison result. Accordingly, the average DC level can be fixed exactly in the same manner as the first embodiment.

In the embodiments, the record signal data string 119 recorded on the optical disk is delayed by about one data block with respect to the inputted record data string 101 and is outputted. Alternatively, the polarity information on the inversion bit of the synchronizing signal in each block may all be examined to be extracted previously, and may be corrected to make the average DC level constant from the record data for one sector which is a record unit of data. Then, the corrected polarity information may be stored, so that the same record data for one sector may be inputted and inversion of bits of the synchronizing signal may be made on the basis of the corrected polarity information.

In the embodiments, the synchronizing signal pattern is already inserted in the record data 101 and the synchronizing signal pattern change-over circuit 117 effects inversion of the synchronizing signal pattern by the inversion signal 113. Alternatively, two kinds of synchronizing signal patterns for inversion and non-inversion may be prepared and the synchronizing signal pattern inversion circuit 117 may be configured to insert one of the synchronizing signal patterns in accordance with the inversion signal 113. The polarity of the data portion subsequent to the inserted synchronizing signal is determined in accordance with the kind of the synchronizing signal.

In the two kinds of inserted synchronizing signal patterns, the number of inversions for one pattern itself (number of code "1'") may be even, whereas the number of inversions of the other pattern itself may be odd.

Further, in this embodiment, the accumulated value is obtained for each block and the inversion control of the synchronizing signal pattern is made. Alternatively, this may be performed for a unit of a plurality of blocks such as two blocks. In this case, the accuracy is slightly lowered but is sufficiently practical.

Although description of a reproducing circuit is omitted, the original pattern of the information signal source can be reproduced easily by performing the reverse of the recording operation. For example, restoration of the signal 117A to the signal 114 can be made easily by judging the kind of the signal 117A by the feature of the synchronizing signal pattern in the signal 117A. In the reproduction, since the level variation of the low frequency component can be suppressed similarly, the recording can be realized stably with high reliability.

As described above, according to the present invention, when the information signal using the coding rule not having the DC free property is recorded on the recording medium, the accumulation value from the head of the information signal to be recorded and the accumulated value after a certain position are previously obtained, and the polarity of the pattern after the certain position of the information signal is determined so that the result of the combined accumulated values is reduced. Accordingly, the recording of the information signal can be made so that the collective average DC level is minimized with the proper pattern polarity, while the accumulated value of the information signal to be recorded after the certain position is considered sufficiently.

What is claimed is:

1. An information recording apparatus for recording binary information signals, including data signals and synchronizing signal patterns inserted at predetermined intervals of the data signals, on a recording medium by using a predetermined coding rule, comprising:

synchronizing signal pattern inversion means for inverting a synchronizing signal pattern of the information signals to be recorded, said synchronizing signal pattern having first and second levels that are replaced with each other at each bit position of said synchronizing signal pattern;

recording means for receiving an output of said synchronizing signal pattern inversion means and for recording said information signals on a recording medium;

prediction means for previously measuring an accumulated value of respective levels of said information signals before and after a selected bit position of a certain synchronizing signal pattern; and control means for controlling inversion of the polarity of said synchronizing signal pattern after said selected bit position of said certain synchronizing signal pattern so that an average DC level of said information signals supplied to said recording means is made constant based on said accumulated value of the previous measurement performed by said prediction means.

2. An information recording apparatus according to claim 1, wherein said prediction means includes accumulation value memory means for previously storing the accumulated value of the information signal levels from a head of the information signals to said selected bit position, measurement means for previously measuring the accumulated value of the information signal levels for a predetermined period after said selected bit position, and an adder and a subtracter for respectively producing an addition value and a subtraction value of an output of said accumulation value memory means and an output of said measurement means.

3. An information recording apparatus according to claim 2, wherein said accumulation value memory means successively updates the stored accumulated value by whichever one of said addition value and said subtraction value has a smaller absolute value.

4. An information recording apparatus according to claim 2, wherein said control means includes means for comparing absolute values of said addition value and said subtraction value with each other, and means for controlling said synchronizing signal pattern inversion means so that the polarity of the information signal pattern following said certain synchronizing signal pattern is inverted only when the absolute value of said subtraction value is smaller than the absolute value of said addition value.

5. An information recording apparatus according to claim 2, wherein said control means compares the polarity of the output of said accumulation value memory means with the polarity of the output of said measurement means, and the apparatus further comprises means for controlling said synchronizing signal pattern inversion means so that the polarity of the information signal pattern after said certain synchronizing signal pattern is not inverted when the polarities of the accumulation value memory means output and the measurement means output are different from each other, and so that the polarity of the information signal pattern after said certain synchronizing signal pattern is inverted when the polarities of the accumulation value memory means output and the measurement means output are the same.

6. An information recording apparatus according to claim 1, wherein said synchronizing signal pattern inversion circuit is configured to prepare two kinds of synchronizing signal patterns having different respective numbers of inversion bits, and to select any one of the synchronizing signal patterns in accordance with whether the polarity of the information signal pattern is inverted or not.

7. An information recording apparatus according to claim 1, wherein said control means controls said average DC level to approach a level which is obtained when the duty ratio of the information signal pattern to be recorded is 50%.

8. An information recording apparatus for recording information on a recording medium, comprising:

means for successively converting information to be recorded into a record signal string by a predetermined coding rule;

means for forming, from said recording signal string, a binary record signal pattern string having first and second binary levels and including synchronizing signal patterns inserted at predetermined intervals of the record signal patterns constituting the record signal pattern string;

inversion means for inverting the polarity of the record signal pattern string following any selected bit position of the synchronizing signal pattern so that the first and second binary levels are replaced with each other;

means for recording a record mark corresponding to said record signal pattern string on said recording medium;

first measurement means for previously measuring differences between an accumulation period for the first binary level and an accumulation period for the second binary level with respect to the record signal pattern string before and after a certain synchronizing signal pattern contained in said record signal pattern string as first and second accumulated values, respectively; and prediction/control means for predicting that an average DC level of said record signal pattern string is made more constant in a case where the polarity of the record signal pattern string following said selected bit position is inverted or in a case where it is not inverted on the basis of the measured result, and controlling said inversion means based on a result of predicting by said prediction/control means to invert the polarity of the record signal pattern string from said selected bit position.

9. An information recording apparatus according to claim 8, wherein said measurement means includes accumulation value memory means for previously storing said first accumulated value from a head of the record signal pattern string to said selected bit position, and second measurement means for previously measuring said second accumulated value for a predetermined period after said selected bit position.

10. An information recording apparatus according to claim 8, wherein said prediction/control means includes adder means for producing an addition value obtained by adding said second accumulated value to said first accumulated value, and subtracter means for producing a subtraction value obtained by subtracting said second accumulated value from said first accumulated value.

11. An information recording apparatus according to claim 10, wherein said prediction/control means includes means for comparing absolute values of said addition value and said subtraction value with each other, and control means for controlling said inversion means to invert the polarity of the record signal pattern string after said certain synchronizing signal pattern when the absolute value of said subtraction value is smaller than that of said addition value, and not to invert the polarity of the record signal pattern string when the absolute value of said subtraction value is equal to or larger than that of said addition value.

12. An information recording apparatus according to claim 9, wherein said prediction/control means includes adder means for producing an addition value obtained by adding said second accumulated value to said first accumulated value, and subtracter means for producing a subtraction value obtained by subtracting said second accumulated value from said first accumulated value.

13. An information recording apparatus according to claim 12, wherein said accumulation value memory means successively updates the stored first accumulated value by whichever one of said addition value and said subtraction value has a smaller absolute value.

14. An information recording apparatus according to claim 8, wherein said certain synchronizing signal pattern comprises the synchronizing signal patterns included in said recording pattern signal string.

15. An information recording apparatus according to claim 8, wherein said synchronizing signal patterns of said certain synchronizing signal pattern are produced at intervals of n synchronizing signals, where n is an integer equal to or larger than 1.

16. An information recording apparatus according to claim 9, wherein said prediction/control means includes means for comparing the polarities of said first and second accumulated values, and means for controlling the polarity of the record signal pattern string such that the polarity of the record signal pattern string following said certain synchronizing pattern signal is not inverted when the polarities are different from each other, and is inverted when the polarities are the same.

17. An information recording apparatus according to claim 8, wherein said inversion means includes means for preparing two kinds of synchronizing signal patterns having different respective numbers of inversion bits and selecting any one of said synchronizing signal patterns in accordance with whether the polarity of the record signal pattern string is inverted or not.

18. An information recording method, comprising the steps of:
(a) converting information to be recorded into a first signal string in accordance with a predetermined coding rule;
(b) successively forming, from said first signal string, a first binary record signal pattern string having first and second binary levels and including synchronizing signal patterns inserted at predetermined intervals of the first binary record signal pattern string;
(c) successively converting information to be recorded into a second signal string in accordance with the predetermined coding rule with a predetermined delay;
(d) forming, from said second signal string, a second binary record signal pattern string having the same configuration as that of the first binary record signal pattern string formed in step (b);
(e) outputting a difference between a period for the first binary level and a period for the second binary level of the first binary record signal pattern string, at the same time as the formation of the first binary record signal pattern string, as a first accumulated value while successively accumulating the difference;
(f) accumulating a difference between the period for the first binary level and the period for the second binary level of the first binary record signal pattern string for a predetermined period subsequent to a certain synchronizing signal pattern in the first binary record signal pattern string each time said certain synchronizing signal pattern appears, and outputting the difference accumulated in step (f) as a second accumulated value;
(g) measuring the first and second accumulated values with respect to the first binary record signal pattern string before and after said certain synchronizing signal pattern each time said certain synchronizing signal pattern appears;
(h) predicting that an average DC level of the first binary record signal pattern string is more constant in the case where the polarity of the first binary record signal pattern string following said certain synchronizing signal pattern is inverted or in the case where it is not inverted based on the measured result in step (g);
(i) inverting the polarity of the second binary record signal pattern string from a corresponding synchronizing signal pattern bit position of the second binary record signal pattern string into a polarity with which the average DC level is more constant based on the result predicted in step (h); and
(j) recording a record mark corresponding to a signal obtained as a result of step (i) on the recording medium.

19. An information recording method according to claim 18, wherein step (h) includes adding the second accumulated value to the first accumulated value to obtain an addition value, subtracting the second accumulated value from the first accumulated value to obtain a subtraction value, predicting that the average DC level in the case where the polarity is inverted is more constant when an absolute value of the addition value is larger than an absolute value of the subtraction value, and predicting that the average DC level in the case where the polarity is not inverted is more constant when the absolute value of the addition value is equal to or smaller than the subtraction value.

20. An information recording method according to claim 18, wherein step (h) includes the steps of predicting that the average DC level in the case where the polarity is inverted is more constant when the polarities of the first and second accumulated values are identical with each other, and predicting that the average DC level in the case where the polarity is not inverted is more constant when the polarities of the first and second accumulated values are different from each other.

* * * * *